(12) United States Patent
Noguchi

(10) Patent No.: US 6,719,428 B2
(45) Date of Patent: Apr. 13, 2004

(54) PROJECTOR DEVICE AND PROJECTOR SYSTEM HAVING IRREGULAR COLOR AND IRREGULAR LUMINANCE CORRECTION CIRCUIT

(75) Inventor: Toshiyuki Noguchi, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 10/284,315

(22) Filed: Oct. 31, 2002

(65) Prior Publication Data
US 2003/0081181 A1 May 1, 2003

(30) Foreign Application Priority Data
Nov. 1, 2001 (JP) .......................... 2001-336556

(51) Int. Cl.[7] .............................................. G03B 21/00
(52) U.S. Cl. ........................................ 353/31; 353/122
(58) Field of Search ............................ 353/31, 33, 34, 353/94, 122; 349/5; 382/274; 348/571

(56) References Cited

U.S. PATENT DOCUMENTS

| | | | | |
|---|---|---|---|---|
| 5,452,019 A | * | 9/1995 | Fukuda et al. | 348/655 |
| 5,803,567 A | * | 9/1998 | Nakanishi | 353/74 |
| 6,558,001 B2 | * | 5/2003 | Ogawa et al. | 353/31 |
| 2002/0063854 A1 | * | 5/2002 | Flint | 353/94 |
| 2003/0063202 A1 | * | 4/2003 | Toyoda et al. | 348/246 |
| 2003/0067589 A1 | * | 4/2003 | Kimura | 353/31 |
| 2003/0112378 A1 | * | 6/2003 | Okunuki et al. | 348/777 |

FOREIGN PATENT DOCUMENTS

JP    9-146496 A    6/1997

* cited by examiner

*Primary Examiner*—Russell Adams
*Assistant Examiner*—Melissa J Koval

(57) ABSTRACT

An irregular color and irregular luminance correction circuit includes a memory, a CPU (Central Processing Unit), and an external interface. In the memory, luminance distribution values, luminance inclination values, screen distribution values, and correction values at n-pieces of levels at each correction point obtained at factory adjustment are stored as digital data. The CPU generates a correction value based on the luminance distribution value, the luminance inclination value, and the screen distribution value and stores these values in the memory as digital data. The irregular color and irregular luminance correction circuit performs irregular color and irregular luminance correction for an input image signal based on the correction value and an interpolation value. With these configurations, irregular color and irregular luminance caused by a display device and a screen in a projector can be solved.

7 Claims, 4 Drawing Sheets

PROJECTOR DEVICE AND PROJECTOR SYSTEM HAVING IRREGULAR COLOR AND IRREGULAR LUMINANCE CORRECTION CIRCUIT

BACKGROUND OF THE INVENTION

1. Field of the Invention

The present invention relates to a projector device and a projector system having an irregular color and irregular luminance correction circuit.

The present application claims priority of Japanese Patent Application No. 2001-336556 filed on Nov. 1, 2001, which is hereby incorporated by reference.

2. Description of Related Art

Generally, in a liquid crystal projector which is a typical display device, caused by an irregular liquid crystal cell gap thickness of each liquid crystal module for Red, Green and Blue (hereinafter may be referred simply to as R, B, and G), an irregularity in a panel surface and a like, respective contrasts for R, G, and B are different. Therefore, an irregular color and an irregular luminance occur in a display image made by transmitting through three liquid modules (R, B, and G) and by synthesis projecting.

Also, in a projector, an irregular color and an irregular luminance occur caused by a characteristic of an angle of visibility in a screen.

To prevent these disadvantages, for example, a technique disclosed in Japanese Patent Application Laid-open No. Hei 09-146496 (hereinafter referred to as prior art) is known.

In a projector using this prior art, as corrections for an irregular color and an irregular luminance caused by liquid crystal modules and for an irregular color and an irregular luminance caused by a characteristic of an angle of visibility of a screen, an image to be displayed in a screen is corrected through the screen, and a correction amount to be corrected is stored in a memory as a correction value at factory adjustment.

However, in the above-described technique, when the image displayed on the screen is corrected, the adjustment for the irregular color and the irregular luminance caused by the liquid crystal modules and the adjustment for the irregular color and the irregular luminance caused by the characteristic of the angle of visibility of the screen are performed at the same time, and a single correction value is stored at factory shipping. Therefore, when the screen whose characteristic of the angle of visibility is remarkably different after shipping is used, the irregular color and the irregular luminance occur. To prevent the irregular color and the irregular luminance, the correction value must be adjusted again at the factory.

SUMMARY OF THE INVENTION

In view of the above, it is an object of the present invention to provide a projector device and a projector system capable of solving an irregular color and an irregular luminance easily without factory adjustment though a screen is changed to another screen having a different characteristic of an angle of visibility after shipping.

According to a first aspect of the present invention, there is provided a projector including:

a display device for displaying an image;

an optical system for enlarged-projecting the image displayed on the display device by a light from a light source;

a memory for storing a luminance distribution value at each point in a projected image when the image is projected on a screen having no characteristic of angle of visibility, a luminance inclination value at each point of the projected image when the image is projected on the screen having no characteristic of angle of visibility, a screen distribution value which is a luminance at each point in the projected image when the image is projected on a screen having a characteristic of angle of visibility after correcting irregular color and irregular luminance by the display device and the optical system, and a correction value to be an image signal level in which a product of the luminance distribution value and the screen distribution value at the each point is equal to the luminance inclination value;

an internal central processing unit for calculating the correction value;

an external interface for inputting data into the memory in accordance with instructions of the internal central processing unit; and an irregular color and irregular luminance correction circuit for obtaining an interpolation value based on the correction value read from the memory and for correcting the irregular color and the irregular luminance on the screen based on the correction value and the interpolation value.

In the foregoing first aspect, a preferable mode is one that wherein, for the plurality of screens of which characteristics of angles of visibility are different, is so configured as to store previously the screen distribution values in the memory, and to calculate the correction value corresponding to each of the screen distribution values and store previously the calculated correction value in the memory.

Another preferable mode is one wherein for the screen of which the characteristic of angle of visibility is not stored, the screen distribution value is updated by using the external interface and the internal central processing unit, and the correction value is further updated.

Still another preferable mode is one wherein the screen is a transparent screen, and a reflective mirror for reflecting the image to be projected to the transparent screen is provided.

According to a second aspect of the present invention, there is provided a projector including:

a display device for displaying an image;

an optical system for enlarged-projecting of the image displayed on the display device by a light from a light source;

a memory for storing a luminance distribution value at each point in a projected image when the image is projected on a screen having no characteristic of angle of visibility, a luminance inclination value at each point of the projected image when the image is projected on the screen having no characteristic of angle of visibility, a screen distribution value which is a luminance at each point in the projected image when the image is projected on a screen having a characteristic of angle of visibility after correcting irregular color and irregular luminance by the display In the foregoing first aspect, a preferable mode is one that wherein, for the plurality of screens of which characteristics of angles of visibility are different, is so configured as to store previously the screen distribution values in the memory, and to calculate the correction value corresponding to each of the screen distribution values and store previously the calculated correction value in the memory.

Another preferable mode is one wherein for the screen of which the characteristic of angle of visibility is not stored, the screen distribution value is updated by using the external interface and the internal central processing unit, and the correction value is further updated.

Still another preferable mode is one wherein the screen is a transparent screen, and a reflective mirror for reflecting the image to be projected to the transparent screen is provided.

According to a second aspect of the present invention, there is provided a projector including:

a display device for displaying an image;

an optical system for enlarged-projecting of the image displayed on the display device by a light from a light source;

a memory for storing a luminance distribution value at each point in a projected image when the image is projected on a screen having no characteristic of angle of visibility, a luminance inclination value at each point of the projected image when the image is projected on the screen having no characteristic of angle of visibility, a screen distribution value which is a luminance at each point in the projected image when the image is projected on a screen having a characteristic of angle of visibility after correcting irregular color and irregular luminance by the display device and the optical system, and a correction value to be an image signal level in which a product of the luminance distribution value and a the screen distribution value at the each point is equal to the luminance inclination value;

a central processing unit for calculating the correction value;

an external interface for inputting data into the memory in accordance with instructions of the central processing unit; and an irregular color and irregular luminance correction circuit for obtaining an interpolation value based on the correction value read from the memory and for correcting the irregular color and the irregular luminance on the screen based on the correction value and the interpolation value.

In the foregoing second aspect, a preferable mode is one wherein a projector device is made up of the display device the optical system, the memory, and the irregular color and irregular luminance correction circuit, and wherein the central processing unit and the external interface are used as external devices.

Another preferable mode is one that wherein, for the plurality of screens of which characteristics of angles of visibility are different, is so configured as to store previously the screen distribution values in the memory, and to calculate the correction value corresponding to each of the screen distribution values and store previously the calculated correction value in the memory.

Still another preferable mode is one wherein, for the screen of which the characteristic of angle of visibility is not stored, the screen distribution value is updated by using the external interface and the central processing unit, and the correction value is further updated.

A further preferable mode is one wherein the screen is a transparent screen, and a reflective mirror for reflecting the image to be projected to the transparent screen is provided.

With these configurations, a plurality of screen distribution values for a plurality of screens whose angles of visibility are different are previously prepared, a rear projector capable of easily solving irregular color and irregular luminance can be provided by changing the screen distribution value only, without factory adjustment even if a screen is changed to another screen whose characteristic of an angle of visibility is different after factory shipping.

Also, when a projector is a rear type, a luminance distribution value depending on a display device and the screen distribution value depending on a screen are stored independently, thereby performing an irregular color and irregular luminance correction of front/rear at the same step.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes for carrying out the present invention will be described in further detail using an embodiment with reference to the accompanying drawings.

Figure 1:
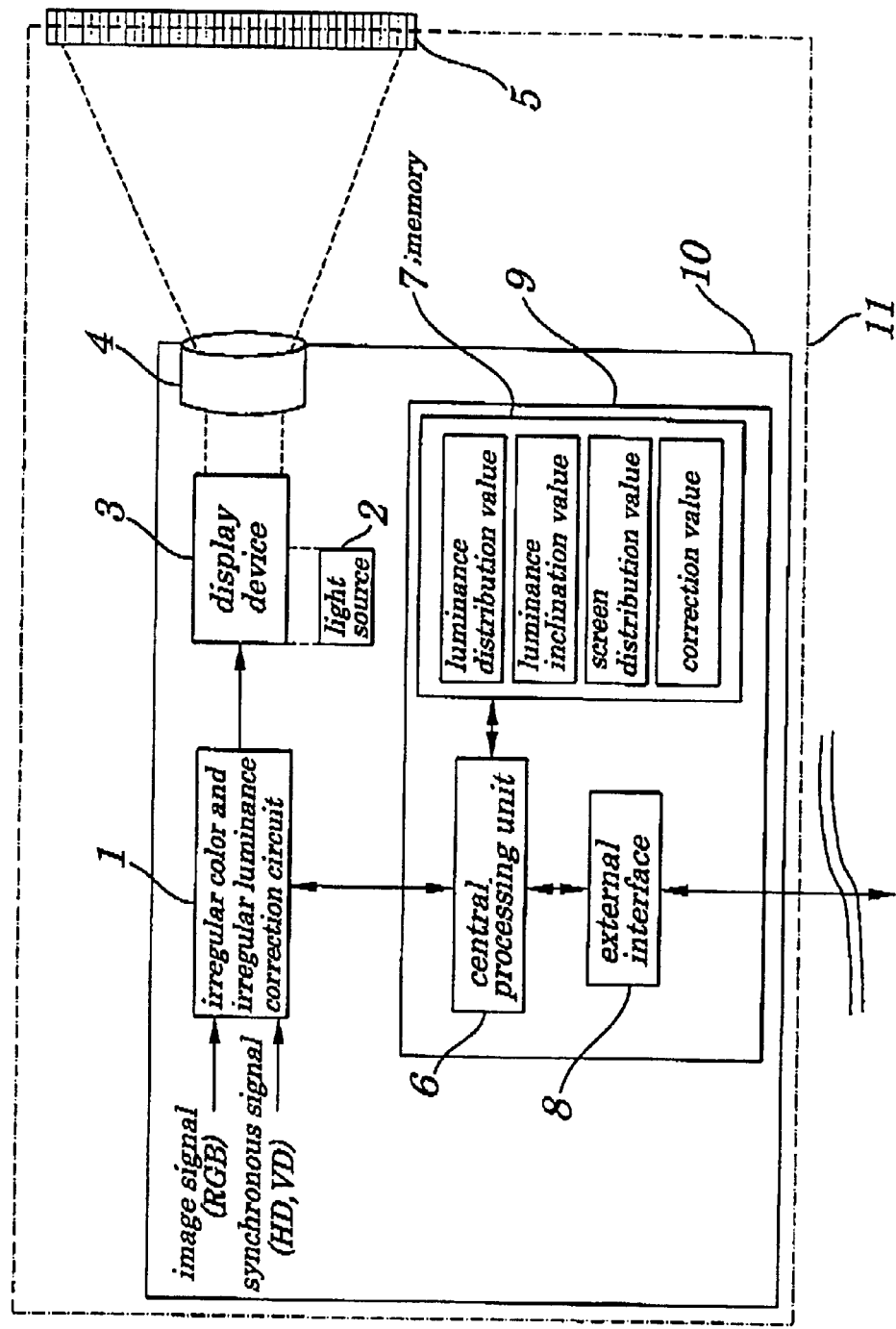
FIG. 1 is a block diagram showing a projector according to an embodiment of the present invention.

FIG. 1 is a block diagram showing a projector according to an embodiment of the present invention. An image signal RGB, a synchronous signal HD, a synchronous signal VD, and a clock (not shown) are input into an irregular color and irregular luminance correction circuit 1.

The irregular color and irregular luminance correction circuit 1 receives the synchronous signal HD, the synchronous signal VD, and the clock, reads a correction value at a correction point at a horizontal direction h and a vertical direction v for n-pieces of image levels based on an address signal corresponding to an irregular color correction point in a screen 5, generates interpolation data based on the correction value for pixels except the correction point, corrects an image signal level based on the interpolation data for each pixel of the inputted image signal RGB and corrects the irregular color and the irregular luminance.

The image signal of which the irregular color and the irregular luminance are corrected is input into a display device 3. A quantity of light from a light source 2 is controlled. The light of which the quantity of light is controlled passes through a projection lens 4 for performing enlarged projection, and then is imaged in the screen 5.

A correction value generation circuit 9 generates a correction value. The correction value generation circuit 9 includes a central processing unit (CPU) 6, a memory 7 and an external interface 8.

In the above-described configuration, when the screen 5 is a reflective screen, there is provided a front projector 10, and when the screen 5 is a transparent screen, there is provided a rear projector 11.

Next, explanations will be given of generation of correction values in the correction value generation circuit 9.

Figure 2:
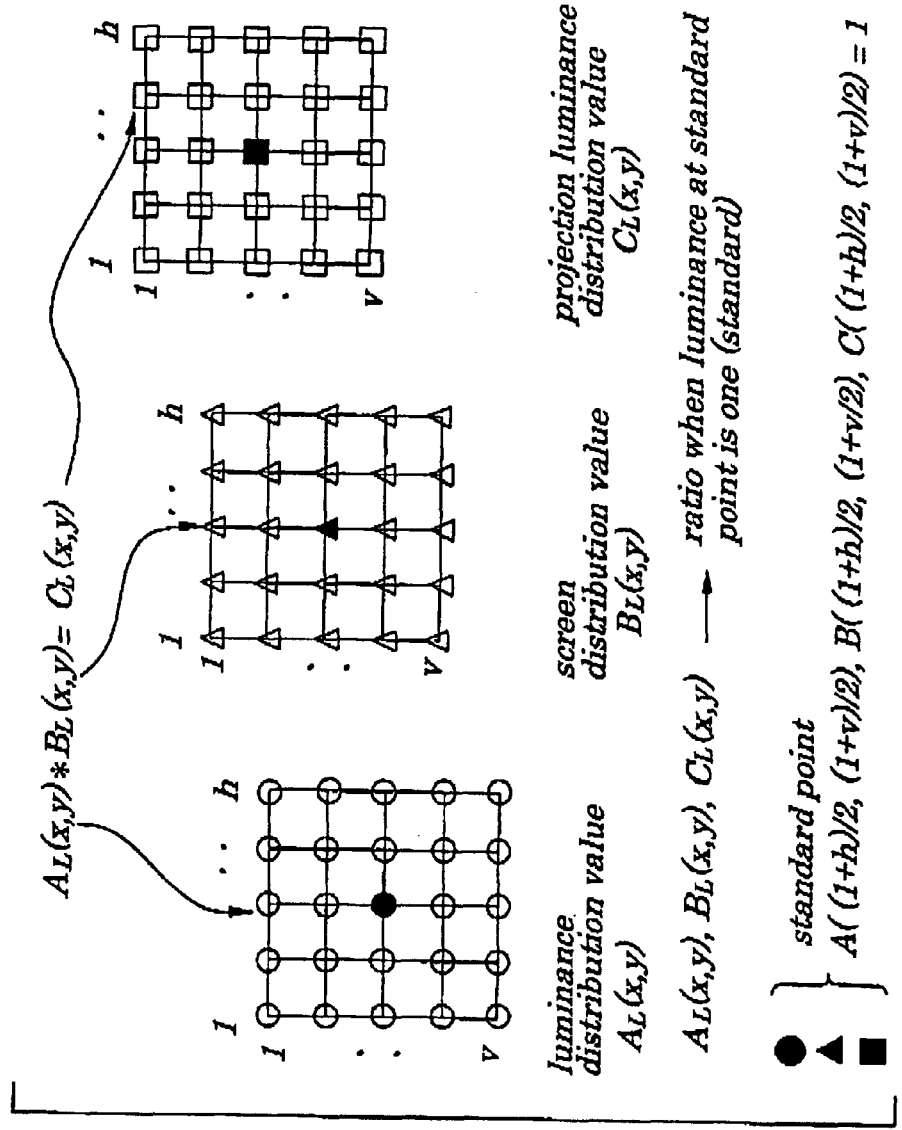
FIG. 2 is a view explaining relationships among respective distribution values.

FIG. 2 shows relationships of respective distribution values stored in the memory 7. For one level among n-pieces of correction image signal levels, when a correction point in a display area is set as a horizontal point h and a vertical point v, a luminance distribution value $A_L$ (x, y) represents a luminance ratio at each correction point when a luminance is set to one at a standard point [x=(1+h)/2, y=(1+v)/2].

The luminance distribution value $A_L$ (x, y) represents irregular color and irregular luminance generated in the display device 3 and an optical system (the projection lens 4). Since the luminance distribution value $A_L$ (x, y) depends on the display device 3 and the optical system (the projection lens 4), this value is generated by using a horizontal point h and a vertical point v of an image displayed on the screen 5 [having no angle of visibility, namely, a screen distribution value $B_L$ (x, y)=1 for all of (x, y)] without correcting the irregular color and the irregular luminance at factory adjustment. The luminance distribution value $A_L$ (x, y) which is generated is stored in the memory 7 at the factory adjustment. The luminance distribution value is represented by data of a point h*v for one correction image level.

Since the screen distribution value $B_L$ (x, y) depends on the characteristic of the angle of visibility in the screen 5, the value is generated by using the image displayed on the screen 5 through the camera after the irregular color and the irregular luminance are sufficiently corrected [in a state where there is no irregular color and no irregular luminance in the display device 3 and the optical system (the projection lens 4), namely, in a state where the luminance distribution value $A_L$ (x, y)=1 for all of (x, y)]. The screen distribution value $B_L$ (x, y) generated when the screen 5 is shipped is stored in the memory 7. Here, since the screen distribution value $B_L$ (x, y) depends on only the screen 5, a plurality of screen distribution values can be prepared for screens of which angles of visibility are different. These values are also represented by data of the point h*v for one correction image level.

A projection luminance distribution value $C_L$ (x, y) is a product of the luminance distribution value $A_L$ (x, y) and the screen distribution value $B_L$ (x, y) by above-described measurement and is a prefigured value obtained by a calculation of irregular color and irregular luminance distributions generated when projecting an image without correcting the irregular color and the irregular luminance caused by the display device 3, the optical system (the projection lens 4), and the screen 5 (when the irregular color and irregular luminance correction circuit 1 is OFF). A projection luminance correction amount $E_L$ (x, y) is a reciprocal of the projection luminance distribution value $C_L$ (x, y) and represents an irregular color and irregular luminance correction value for a standard point at each correction point.

Figures 3, 4:
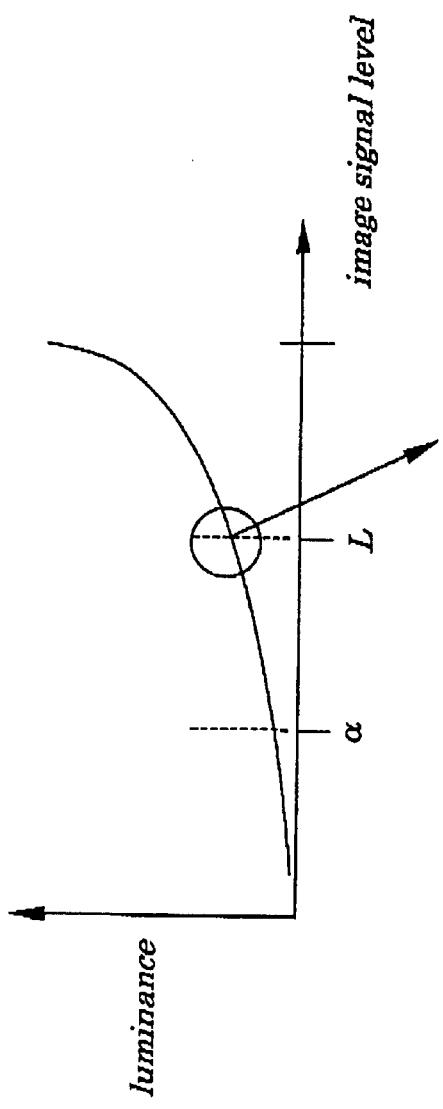
FIG. 3 a graph for explaining a luminance inclination value.
FIG. 4 is a table showing a luminance inclination value.

FIG. 3 is a graph for explaining a luminance inclination value $D(x, y)_L$ stored in the memory 7, FIG. 4 is a table showing the luminance inclination value $D(x, y)_L$ stored in the memory 7. In an upper apparatus connected to the external interface 8, it is assumed that each correction point in the display area is a horizontal point h and a vertical point v, and a luminance inclination value of a coordinate point (x, y) of hxv is obtained. The luminance inclination value is represented by a ratio of a luminance of an image signal level (L−m)<L<(L+m) near the image signal level L, where m is an integer greater than or equal to 1, and a luminance of the image signal level L.

Since the luminance inclination value also depends on the display device 3 and the optical system (the projection lens 4), the value is generated by using the image displayed on the screen 5 [having no characteristic of the angle of visibility, namely, $B_L$ (x, y)=1] for n(=2m+1) pieces of correction image levels for the horizontal point h and the vertical point v without irregular color and irregular luminance correction at factory adjustment.

Next, explanations will be given of generating correction values of each distribution value and the luminance inclination value stored in the memory 7 at factory adjustment.

The projection luminance distribution value $C_L$ (x, y) representing the irregular color and irregular luminance generated without correcting the irregular color and irregular luminance caused by the display device 3, the optical system (the projection lens 4), and the screen 5 is a product of the luminance distribution value $A_L$ (x, y) and the screen distribution value $B_L$ (x, y).

Then, the central processing unit 6 reads the luminance distribution value $A_L$ (x, y) and the screen distribution value $B_L$ (x, y) stored in the memory 7 and calculates $1/C_L$ (x, y) which is a projection luminance correction amount $E_L$ (x, y).

Then, the central processing unit 6 refers to the luminance inclination value $D_L$ (x, y) by using the projection luminance correction amount $E_L$ (x, y), and specifies the luminance inclination value $D_L$ (x, y) in which the same value is stored as the projection luminance correction amount $E_L$ (x, y).

Concretely, in image signal levels (L−m to L+m) shown in FIG. 4, values such as 0.9 to 1.1 are stored for each position (x, y). The projection luminance correction amount $E_L$ (x, y) becomes the same value or a close value among these values. The image signal level corresponding to the value is specified among the image signal levels (L−m to L+m). For example, for a pixel at a first row and a first column, an image signal level L−m is specified, and for a pixel at a first row and a second column, an image signal level L+1 is specified. The specified image signal level is output to the irregular color and irregular luminance correction circuit 1 as a correction value and is stored in the memory 7.

The correction value generation circuit 9, when it is necessary to generate a new correction value, during factory adjustment, and when the screen 5 is changed, updates the data stored in the memory 7 using the external interface circuit 8 and the central processing unit 6, generates a new correction value by the above-described procedure and stores the new correction value in the memory 7.

The irregular color and irregular luminance correction circuit 1 corrects the irregular color and the irregular luminance based on the new correction value.

As described above, when the screen 5 is changed, by updating only the screen distribution value, it is possible to generate a correction value under consideration of the irregular color and irregular luminance caused by all of the display device 3, the optical system (the projection lens 4), and the screen 5, and it is possible to correct the irregular color and irregular luminance caused by the display device 3, the optical system (the projection lens 4), and the screen 5.

It is thus apparent that the present invention is not limited to the above embodiments but may be changed and modified without departing from-the scope and spirit of the invention.

Figure 5:
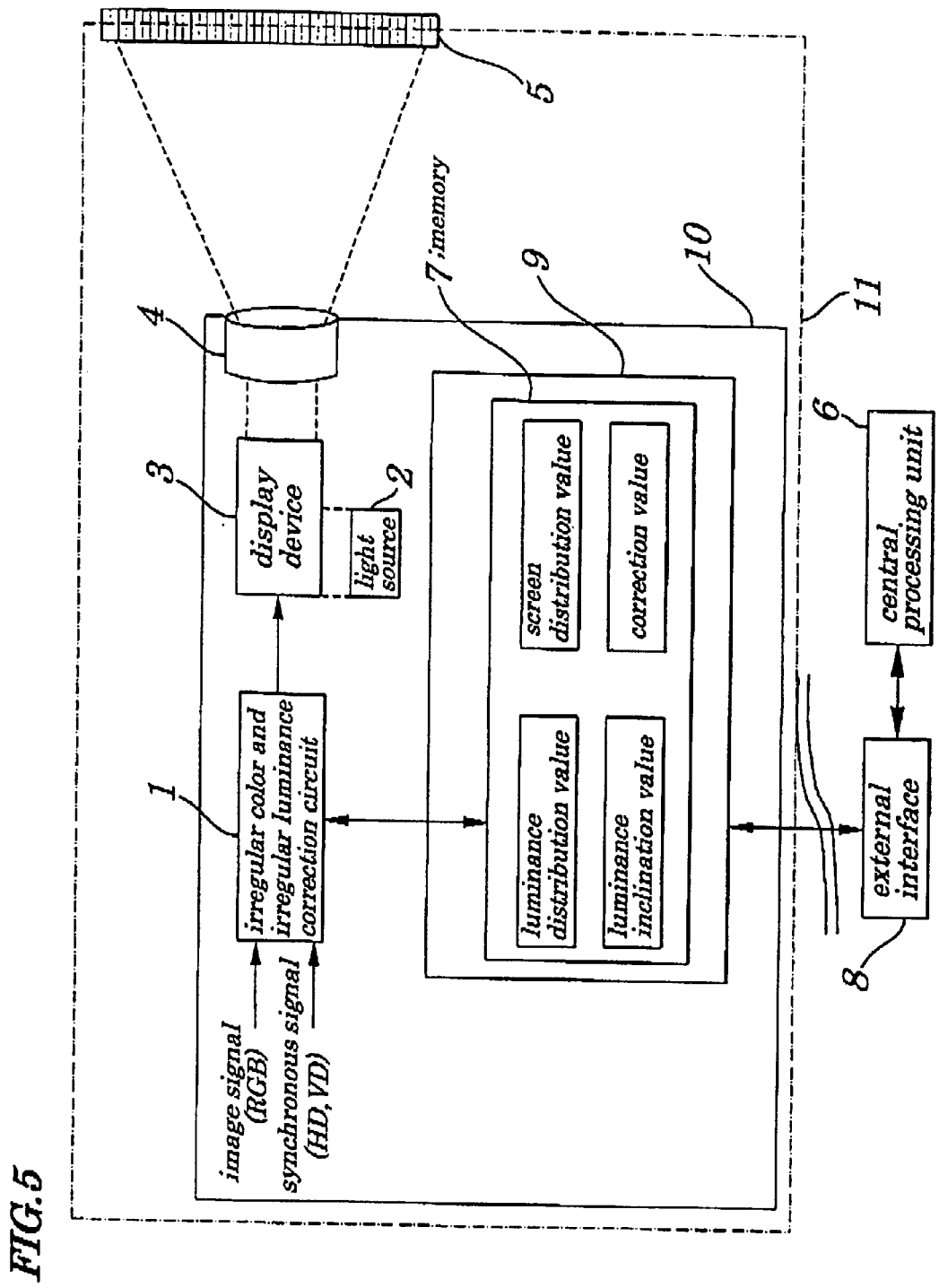
FIG. 5 is a block diagram showing a projector according to an embodiment of the present invention.

For example, it is not necessarily be needed to incorporate the irregular color and irregular luminance correction circuit 1, display device 3, the central processing unit 6, the memory 7 and the external interface 8 integrally with each other in a projector body. For example, as shown in FIG. 5, the central processing unit 6 and the external interface 8 may be arranged at the outside of the projector. If desirable, the memory 7 and/or the irregular color and irregular luminance correction circuit 1 as well as the central processing unit 6 and the external interface 8 may be arranged at the outside of the projector.

Also, in the rear projector 11 provided with a transparent screen and a reflective mirror for reflecting an image projected from the projector to the screen 5, a characteristic where a reflective mirror characteristic is superimposed on a transparent screen characteristic may be used as a screen distribution value.

What is claimed is:

1. A projector device comprising:

a display device for displaying an image;

an optical system for enlarged-projecting said image displayed on said display device by a light from a light source;

a memory for storing:
  a luminance distribution value at each point in a projected image when said image is projected on a screen having no characteristic of angle of visibility,
  a luminance inclination value at each point of said projected image when said image is projected on said screen having no characteristic of angle of visibility, said luminance inclination value is a ratio of a luminance of an image signal level (L−m)<L<(L+m) near the image signal level L, where m is an integer greater than or equal to 1, and a luminance of the image signal level L,
  a screen distribution value which is a luminance at each point in said projected image when said image is projected on a screen having a characteristic of angle of visibility after correcting irregular color and irregular luminance by said display device and said optical system, and
  a correction value which is an image signal level in which a product of said luminance distribution value and said screen distribution value at said each point is equal to said luminance inclination value;

an internal central processing unit for calculating said correction value;

an external interface for inputting data into said memory in accordance with instructions of said internal central processing unit; and an irregular color and irregular luminance correction circuit for obtaining an interpolation value based on said correction value read from said memory and for correcting said irregular color and irregular luminance on said screen based on said correction value and said interpolation value.

2. The projector system according to claim 1, wherein, for screens having different characteristics of angles of visibility, corresponding screen distribution values are stored in said memory, and a correction value corresponding to each of said screen distribution values is calculated and stored in said memory.

3. The projector device according to claim 1, wherein, for a screen whose characteristic of angle of visibility is not stored in said memory, said screen distribution value is updated by using said external interface and said internal central processing unit, and said correction value is further updated based on said updated screen distribution value.

4. A projector system comprising:

a display device for displaying an image;

an optical system for enlarged-projecting of said image displayed on said display device by a light from a light source;

a memory for storing:
  a luminance distribution value at each point in a projected image when said image is projected on a screen having no characteristic of angle of visibility,
  a luminance inclination value at each point of said projected image when said image is projected on said screen having no characteristic of angle of visibility, said luminance inclination value is a ratio of a luminance of an image signal level (L−m)<L<(L+m) near the image signal level L, where m is an integer greater than or equal to 1, and a luminance of the image signal level L,
  a screen distribution value which is a luminance at each point in said projected image when said image is projected on a screen having a characteristic of angle of visibility after correcting irregular color and irregular luminance by said display device and said optical system, and
  a correction value which is an image signal level in which a product of said luminance distribution value and said screen distribution value at said each point is equal to said luminance inclination value;

a central processing unit for calculating said correction value;

an external interface for inputting data into said memory in accordance with instructions of said central processing unit; and an irregular color and irregular luminance correction circuit for obtaining an interpolation value based on said correction value read from said memory and for correcting said irregular color and said irregular luminance on said screen based on said correction value and said interpolation value.

5. The projector system according to claim 4, wherein a projector device comprises: said display device, said optical system, said memory, and said irregular color and irregular luminance correction circuit, and wherein said central processing unit and said external interface are external devices.

6. The projector system according to claim 4, wherein, for screens having different characteristics of angles of visibility, corresponding screen distribution values are stored in said memory, and a correction value corresponding to each of said screen distribution values is calculated and stored in said memory.

7. The projector system according to claim 4, wherein, for a screen whose characteristic of angle of visibility is not stored in said memory, said screen distribution value is updated by using said external interface and said central processing unit, and said correction value is further updated based on said updated screen distribution value.

* * * * *